US008682254B2

(12) United States Patent
Potkonjak

(10) Patent No.: US 8,682,254 B2
(45) Date of Patent: Mar. 25, 2014

(54) WIRELESS COMMUNICATION SYSTEM MODELING

(75) Inventor: Miodrag Potkonjak, Los Angeles, CA (US)

(73) Assignee: Empire Technology Development LLC, Wilmington, DE (US)

( * ) Notice: Subject to any disclaimer, the term of this patent is extended or adjusted under 35 U.S.C. 154(b) by 932 days.

(21) Appl. No.: 12/487,669

(22) Filed: Jun. 19, 2009

(65) Prior Publication Data

US 2010/0323626 A1    Dec. 23, 2010

(51) Int. Cl.
| | |
|---|---|
| *H04B 17/00* | (2006.01) |
| *H04B 1/10* | (2006.01) |
| *H04B 15/00* | (2006.01) |
| *H04B 3/46* | (2006.01) |
| *H04Q 1/20* | (2006.01) |
| *H03D 1/04* | (2006.01) |
| *H03D 1/06* | (2006.01) |
| *H03K 5/01* | (2006.01) |
| *H03K 6/04* | (2006.01) |
| *H04L 1/00* | (2006.01) |
| *H04L 25/08* | (2006.01) |
| *H04W 4/00* | (2009.01) |

(52) U.S. Cl.
USPC ........ 455/67.11; 455/501; 455/296; 375/227; 375/346; 370/332

(58) Field of Classification Search
USPC ............ 455/501, 522, 63.1, 67.11, 67.13, 69, 455/222, 226.1, 296; 375/224, 225, 226, 375/227, 346; 370/241, 318, 332
See application file for complete search history.

(56) References Cited

U.S. PATENT DOCUMENTS

| | | | |
|---|---|---|---|
| 5,345,599 A | 9/1994 | Paulraj et al. | |
| 5,675,581 A | 10/1997 | Soliman | |
| 6,112,092 A | 8/2000 | Benveniste | |
| 7,835,702 B1 * | 11/2010 | Karmi | 455/67.11 |
| 7,873,323 B2 * | 1/2011 | Drabeck et al. | 455/67.13 |
| 7,933,557 B1 * | 4/2011 | Townley et al. | 455/67.11 |
| 7,948,966 B2 * | 5/2011 | Hughes et al. | 370/351 |
| 8,089,881 B2 * | 1/2012 | Walton et al. | 370/235 |
| 2002/0044014 A1 | 4/2002 | Wright et al. | |
| 2004/0214577 A1 | 10/2004 | Borst et al. | |
| 2005/0049832 A1 | 3/2005 | Gorinevsky | |
| 2008/0151985 A1 * | 6/2008 | Chin et al. | 375/231 |

OTHER PUBLICATIONS

Jorgen Bach Andersen, Array Gain and Capacity for Known Random Channels with Multiple Element Arrays at Both Ends, IEEE Journal on selected areas in communications, Nov. 2000, p. 2172-2178, vol. 18, No. 11 (http://www.elo.utfsm.cl/~ipd465/Papers%20y%20apuntes%2Ovarios/Array%20Gain%20%20%20%20%20%20J%20Bach.pdf).

(Continued)

*Primary Examiner* — Andrew Wendell
(74) *Attorney, Agent, or Firm* — Ren-Sheng International

(57) ABSTRACT

Techniques are generally described related to modeling a wireless communication system that includes multiple communication connections. Example systems, apparatuses, methods and processes may include one or more of identifying a first parameter and a first operational characteristic of interest of a first one of the communication connections, activating the first one of the communication connections based on the first parameter, collecting data associated with the first parameter and the first operational characteristic of interest when the first one of the communication connections is active; applying a statistical technique to the collected data to establish a model, and validating the model.

23 Claims, 5 Drawing Sheets

(56) References Cited

OTHER PUBLICATIONS

J. Fuhl, A.F.Molisch and E.Bonek, Unified channel model for mobile radio systems with smart antennas, IEE Proceedings online No. 19981750, Feb. 1998, p. 32-41, vol. 145, No. 1 (http://kom.aau.dk/~pe/education/phd/litt/Fuhl_IEE98.pdf).

Richard B. Ertel, Paulo Cardieri, Kevin W. Sowerby, Theodore S. Rappaport and Jeffrey H. Reed, Overview of Spatial Channel Models for Antenna Array Communication Systems, IEEE Personal Communications, Feb. 1998, p. 10-22 (http://inst.cs.berkeley.edu/~n225c/sp08/Ertel_98.pdf).

Vahid Tarokh, Nambi Seshadri and A. R. Calderbank, Space—Time Codes for High Data Rate Wireless Communication: Performance Criterion and Code Construction, IEEE Transactions on information theory, Mar. 1998, p. 744-765, vol. 44, No. 2.

J. Ling, D. Chizhik, P. Wolniansky, R. Valenzuela, N. Costa and K. Huber, Multiple transmit multiple receive (MTMR) capacity survey in Manhattan, Electronics Letters, Aug. 2, 2007, p. 1041-1042, vol. 37 No. 16 (http://dmitrychizhik.com/chizhik_NYC_MIMO_2001.pdf).

Da-Shan Shiu, Gerard J. Foschini, Michael J. Gans, and Joseph M. Kahn, Fading Correlation and Its Effect on the Capacity of Multielement Antenna Systems, IEEE Transactions on Communications, Mar. 2000, p. 502-513, vol. 48, No. 3 (http://www-ee.stanford.edu/~jmk/pubs/mea.cap.correl.fading.pdf).

D. Chizhik, G.J. Foschini and RA. Valenzuela, Capacities of multielement transmit and receive antennas: Correlations and keyholes, Electronics Letters, Jun. 22, 2000, p. 1099-1100, vol. 36, No. 73.

G.D. Golden, C.J. Foschini, R.A., Valenzuela and P.W. Wolniansky, Detection algorithm and initial laboratory results using V-BLAST space-time communication architecture, Electronics Letters, Jan. 7, 1999, vol. 35 No. 1 (http://www.ee.columbia.edu/~jiantan/E6909/goldenandfoschini.pdf).

G.J. Foschini and M.J. Gans, On Limits of Wireless Communications in a Fading Environment when Using Multiple Antennas, Wireless Personal Communications, 1998, 6: 311-335, Kluwer Academic Publishers.

Gerard J. Foschini, Layered Space-Time Architecture for Wireless Communication in a Fading Environment When Using Multi-Element Antennas, Bell Labs Technical Journal, Autumn 1996, p. 41-59 (http://users.ece.utexas.edu/~rheath/courses/mimo/suggested_readings/ref/11-1.pdf).

Gregory G. Raleigh and John M. Cioffi, Spatio-Temporal Coding for Wireless Communication, IEEE Transactions on Communications, Mar. 1998, p. 357-366, vol. 46, No. 3.

Gerard J. Foschini, Dmitry Chizhik, Michael J. Gans, Constantinos Papadias and Reinaldo A. Valenzuela, Analysis and Performance of Some Basic Space—Time Architectures, IEEE Journal on Selected Areas in Communications, Apr. 2003, p. 303-320, vol. 21, No. 3.

Persefoni Kyritsi and Donald C. Cox, Propagation Characteristics of Horizontally and Vertically Polarized Electric Fields in an Indoor Environment: Simple Model and Results, IEEE, 2001, p. 1422-1426 (http://kom.aau.dk/~persa/conferences/vtc01_fall.pdf).

Jean Philippe Kermoal, Laurent Schumacher, Preben E. Mogensen and Klaus I. Pedersen, Experimental Investigation of Correlation Properties of MIMO Radio Channels for Indoor Picocell Scenarios, IEEE, 2000 (http://www.info.fundp.ac.be/~lsc/Publications/2000/VTC%20Fall/a37467.pdf).

Kai Yu, Mats Bengtsson, Bjorn Ottersten, Darren Mcnamara, Peter Karlsson and Mark Beach, A wideband statistical model for nlos indoor mimo channels, IEEE, 2002, p. 370-374 (http://rose.bris.ac.uk/dspace/bitstream/1983/326/1/Yu_IEEE_VTC_Spring2002.pdf).

Kai Yu, Mats Bengtsson, Bjorn Ottersten, Darren McNamara, Peter Karlsson and Mark Beach, Second Order Statistics of NLOS Indoor MIMO Channels Based on 5.2 GHz Measurements, IEEE, 2001, p. 156-160 (http://rose.bris.ac.uk/dspace/bitstream/1983/350/1/YU_IEEE_GLOBECOM_2001.pdf).

Jon W. Wallace and Michael A. Jensen, Statistical Characteristics of Measured MIMOWireless Channel Data and Comparison to Conventional Models, IEEE, 2001 (http://www.faculty.jacobs-university.de/jwallace/xwallace/pubs/wallace/vtc_2001b.pdf).

Ali Abdi and Mostafa Kaveh, A Space—Time Correlation Model for Multielement Antenna Systems in Mobile Fading Channels, IEEE Journal on Selected Areas in Communications, Apr. 2002, p. 550-560, vol. 20, No. 3 (http://www.elo.utfsm.cl/~ipd481/SAC%20April%202002/00995514.pdf).

Chen-Nee Chuah, David N. C. Tse, Joseph M. Kahn and Reinaldo A. Valenzuela, Capacity Scaling in MIMO Wireless Systems Under Correlated Fading, IEEE Transactions on Information Theory, Mar. 2002, p. 637-650, vol. 48, No. 3.

Dimitry Chizhik, Farrokh Rashid-Farrokhi, Jonathan Ling and Angel Lozano, Effect of Antenna Separation on the Capacity of BLAST in Correlated Channels, IEEE Communications Letters, Nov. 2000, p. 337-339, vol. 4, No. 11.

Andrea Goldsmith, Syed Ali Jafar, Nihar Jindal and Sriram Vishwanath, Fundamental Capacity of MIMO Channels, Nov. 8, 2002, p. 1-36.

Quentin H. Spencer, Brian D. Jeffs, Michael A. Jensen and A. Lee Swindlehurst, Modeling the Statistical Time and Angle of Arrival Characteristics of an Indoor Multipath Channel, IEEE Journal on Selected Areas in Communications, Mar. 2000, p. 347-360, vol. 18, No. 3.

Ralf R. Muller, A Random Matrix Model of Communication Via Antenna Arrays, IEEE Transactions on Information Theory, Sep. 2002, p. 2495-2506, vol. 48, No. 9.

Ezio Biglieri, John Proakis and Shlomo Shamai (Shitz), Fading Channels: Information-Theoretic and Communications Aspects, IEEE Transactions on Information Theory, Oct. 1998, p. 2619-2692, vol. 44, No. 6.

Dmitry Chizhik, Gerard J. Foschini, Michael J. Gans and Reinaldo A. Valenzuela, Keyholes, Correlations, and Capacities of Multielement Transmit and Receive Antennas, IEEE Transactions on Wireless Communications, Apr. 2002, p. 361-368, vol. 1, No. 2.

Gregory G. Raleigh and V. K. Jones, Multivariate Modulation and Coding for Wireless Communication, IEEE Journal on Selected Areas in Communications, May 1999, p. 851-866, vol. 17, No. 5.

P. F. Driessen and G. J. Foschini, on the Capacity Formula for Multiple Input—Multiple Output Wireless Channels: A Geometric Interpretation, IEEE Transactions on Communications, Feb. 1999, p. 173-176, vol. 47, No. 2.

Jiann-Ching Guey, Michael P. Fitz, Mark R. Bell and Wen-Yi Kuo, Signal Design for Transmitter Diversity Wireless Communication Systems Over Rayleigh Fading Channels, IEEE, 1996, p. 136-140.

Jean Philippe Kermoal, Preben E. Mogensen, Soren H. Jensen, Jorgen B. Andersen, Frank Frederiksen, Troels B. Sprrensen and Klaus I. Pedersen, Experimental Investigation of Multipath Richness for Multi-Element Transmit and Receive Antenna Arrays, IEEE, 2000, p. 2004-2008.

Carol C. Martin, Jack H. Winters and Nelson R. Sollenberger, Multiple-Input Multiple-Output (MIMO) Radio Channel Measurements, IEEE, 2000, p. 774-779.

P. Soma, D.S. Baum, V. Erceg, R. Krishnamoorthy and A.J. Paulraj, Analysis and Modeling of Multiple-Input Multiple-Output (MIMO) Radio Channel Based on Outdoor Measurements Conducted at 2.5GHz for Fixed BWA Applications, IEEE, 2002, p. 272-276.

Sergey L. Loyka, Channel Capacity of MIMO Architecture Using the Exponential Correlation Matrix, IEEE Communications Letters, Sep. 2001, p. 369-371, vol. 5, No. 9.

Helmut Bolcskei, David Gesbert and Arogyaswami J. Paulraj, On the Capacity of OFDM-Based Spatial Multiplexing Systems, IEEE Transactions on Communications, Feb. 2002, p. 225-234, vol. 50, No. 2.

Arogyaswami J. Paulraj and Constantinos B. Papadias, Space-Time Processing for Wireless Communications, IEEE Signal Processing Magazine, Nov. 1997, p. 49-83.

Jack H. Winters, On the Capacity of Radio Communication Systems with Diversity in a Rayleigh Fading Environment, IEEE Journal on Selected Areas in Communications, Jun. 1987, p. 871-878, vol. SAC-5, No. 5.

G.J. Foschini and M.J. Gans, On Limits of Wireless Communications in a Fading Environment when Using Multiple Antennas, Wireless Personal Communications, 1998, 6: 311-335.

(56) References Cited

OTHER PUBLICATIONS

Richard B. Ertel, Paulo Cardieri, Kevin W. Sowerby, Theodore S. Rappaport and Jeffrey H. Reed, Overview of Spatial Channel Models for Anfenna Array Communication Systems, IEEE Personal Communications, Feb. 1998, p. 10-22.

Rickard Stridh, Bjorn Ottersten and Peter Karlsson, MIMO Channel Capacity on a Measured Indoor Radio Channel at 5.8 GHz, IEEE, 2000, p. 733-737.

Carol C. Martin, Jack H. Winters and Nelson R. Sollenherger, Multiple-Input Multiple-Output (MIMO) Radio Channel Measurements, IEEE, 2001, p. 418-421.

D.P. Mcnamara, M.A. Beach, P.N. Fletcher & P. Karlsson, Initial Investigation of Multiple-Input Multiple-Output (MIMO) Channels in Indoor Environments, IEEE, 2000, p. 139-143.

Jon K Wallace and Michael A. Jensen, Spatial Characteristics of the MIMO Wireless Channel:Experimental Data Acquisition and Analysis, IEEE, 2001, p. 2497-2500.

Notification of Transmittal of the International Search Report and the Written Opinion of the International Searching Authority, Sep. 10, 2010.

Andreas F. Molisch, Martin Steinbauer, Martin Toeltsch, Ernst Bonek and Reiner S. Thoma, Capacity of MIMO Systems Based on Measured Wireless Channels, IEEE Journal on Selected Areas in Communications, Apr. 2002, p. 561-569, vol. 20, No. 3.

Adel A. M. Saleh and Reinaldo a. Valenzuela, A Statistical. Model for Indoor Multipath Propagation, IEEE Journal on Selected Areas in Communications, Feb. 1987, p. 128-137, vol. SAC-5, No. 2.

Theodore S. Rappaport, Scott Y. Seidel and Koichiro Takamizawa, Statistical Channel Impulse Response Models for Factory and Open Plan Building Radio Communication System Design, IEEE Transactions on Communications, May 1991, p. 794-807, vol. 39, No. 5.

Homayoun Hashemi, Impulse Response Modeling of Indoor Radio Propagation Channels, IEEE Journal on Selected Areas in Communications, Sep. 1993, p. 967-978, vol. 11, No. I.

Steven J. Howard and Kaveh Pahlavan, Autoregressive Modeling of Wide-Band Indoor Radio Propagation, IEEE Transactions on Communications, Sep. 1992, p. 1540-1552, vol. 40, No. 9.

R. Ganesh and K. Pahlavan, Statistical modelling and computer simulation of indoor radio channel, IEE Proceedings-I, Jun. 1991, p. 153-161, vol. 138, No. 3.

Hisato Iwai and Yoshio Karasawa, Wideband Propagation Model for the Analysis of the Effect of the Multipath Fading on the Near-Far Problem in CDMA Mobile Radio System, IEICE Trans. Commun., Feb. 1993, p. 103-112, vol. E76-B, No. 2.

Kai Yu, Mats Bengtsson, Bjorn Ottersten, Darren Mcnamara, Peter Karlsson and Mark Beach, A 20 MHz HiperLAN/2 MIMO Channel Model in NLOS Indoor Scenarios, Mar. 26, 2002.

Thomas Svantesson, A Physical MIMO Radio Channel Model for Multi-Element Multi-Polarized Antenna Systems, IEEE, 2001, p. 1083-1087.

Da-Shan Shiu, Gerard J. Foschini, Michael J. Gans and Joseph M. Kahn, Fading Correlation and Its Effect on the Capacity of Multielement Antenna Systems, IEEE Transactions on Communications, Mar. 2000, p. 502-513, vol. 48, No. 3.

D. Gesbert, H. Bolcskei, D. Gore and A. Paulraj, MIMO Wireless Channels: Capacity and Performance Prediction, IEEE, 2000, p. 1083-1088.

Kai Yu, Mats Bengtsson, Bjorn Ottersten, Peter Karlsson, Darren McNamara and Mark Beach, Measurement Analysis of NLOS Indoor MIMO Channels, Sep. 24, 2001.

Akbar M. Sayeed, Modeling and Capacity of Realistic Spatial MIMO Channels, IEEE, 2001, p. 2489-2492.

A standardized set of MIMO radio propagation channels, Jeju, Korea, Nov. 19-23, 2001, p. 1-13.

Farinaz Koushanfar et al., "Sleeping Coordination for Comprehensive Sensing Using Isotonic Regression and Domatic Partitions", 25th IEEE International Conference on Computer Communications, Apr. 23, 2006, pp. 1-13.

Alberto Cerpa et al., "Statistical Model of Lossy Links in Wireless Sensor Networks", Posters, Center for Embedded Network Sensing, Jan. 1, 2004, pp. 1-16, University of California, Los Angeles.

Alberto Cerpa et al., Temporal Properties of Low Power Wireless Links: Modeling and Implications on Multi-Hop Routing, Center for Embedded Network Sensing, Jan. 1, 2005, pp. 1-13, University of California, Los Angeles.

I. Emre Telatar, "Capacity of Multi-antenna Gaussian Channels", European Transactions on Telecommunications, vol. 10, No. 6, pp. 585-595, Nov./Dec. 1999.

Klaus I. Pedersen et al., "A Stochastic Multiple-Input-Multiple-Output Radio Channel Model for Evaluation of Space-Time Coding Algorithms", Vehicular Technology Conference, 2000/IEEE VTS-Fall VTC 2000, pp. 893-897, vol. 2.

Matthias Stege et al., "A Multiple Input—Multiple Output Channel Model for Simulation of Tx- and RX-Diversity Wireless Systems", Vehicular Technology Conference, 2000/IEEE VTS-Fall VTC 2000, pp. 833-839, vol. 2.

Japanese Office Action, JP2012-516112, Mar. 4, 2013.

* cited by examiner

WIRELESS COMMUNICATION SYSTEM MODELING

BACKGROUND

Description of the Related Art

Unless otherwise indicated herein, the approaches described in this section are not prior art to the claims in this application and are not admitted to be prior art by inclusion in this section.

In communication industry, a channel typically refers to a medium used to convey information in a signal form from a transmitter to a receiver. A channel may be characterized with properties such as signal to noise ratio, type of noise, and the level of Doppler effects. The characteristics of a channel may influence the propagation of signals traveling in the channel and thus affect communication quality of a communication system that includes the channel. In addition, the quality of a channel is governed by nature and is associated with an upper bound on what is achievable. Within a channel, a link may be further established after some parameters of a communication system are decided. Such parameters may include antenna power, antenna orientation, antenna height, packet length, type of modulation, type and parameters of error correction code, and synchronization code. One approach to design and deploy a communication system may begin with developing models to characterize links and/or channels in the communication system and then designing the transmitter and the receiver to compensate for any identified undesirable properties captured in the models. These models may be used for a variety of purposes including traffic shaping, node deployment, power minimization, testing and debugging, detection of interference, and malicious attack detection.

Some communication systems are complex but are highly desirable as they accommodate increased bandwidths. Such communication systems may include a multi-channel wireless communication system, for example, multiple-input and multiple-output (or "MIMO") system, orthogonal frequency division multiplexing (or "OFDM" system), multitone modulation system, wideband code division multiple access (CDMA) system. In a multiple-input and multiple-output (or "MIMO") system, multiple antennas are used at both the transmitter and the receiver and thus bandwidths between the transmitter and the receiver may be increased proportionally to the number of employed antennas on the transmitter and the receiver without increasing the operating frequencies range and power levels. Due to the characteristics of the MIMO system, the MIMO system may be used for transferring signals at a high speed, for example, above 1 gigabyte per second.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings. In the drawings:

DETAILED DESCRIPTION

Figure 1:
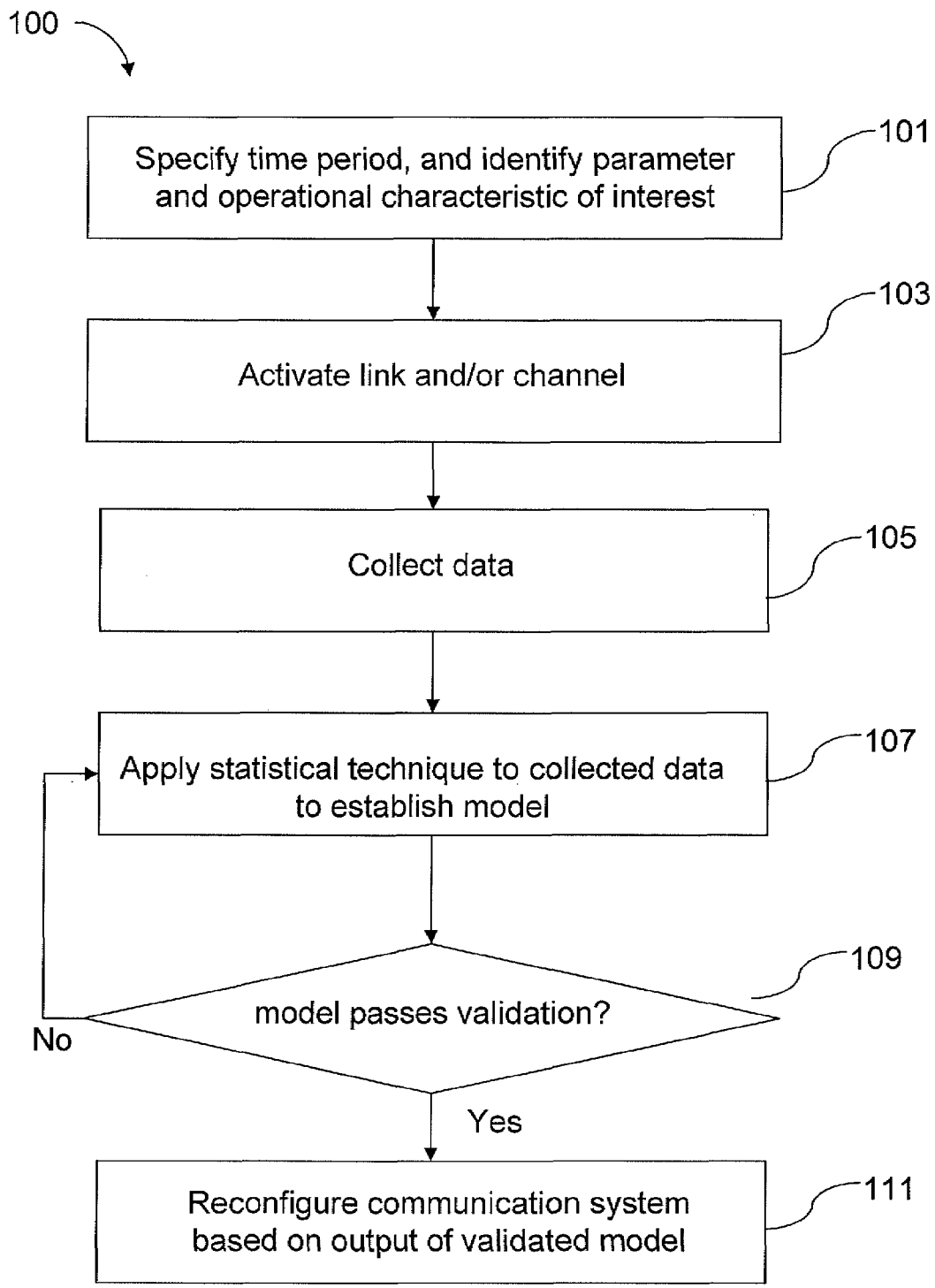
FIG. 1 is a flowchart of a method or process for developing a model to characterize a communication connection in a communication system.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and make part of this disclosure.

This disclosure is drawn, inter alia, to methods, apparatus, computer programs and systems related to analyzing performances of communication connections in a communication system and developing the communication system accordingly. In this disclosure, a communication connection may refer to a communication link (also referred to as a "link"), a communication channel (also referred to as a "channel"), or a combination of a communication link and a communication channel. A channel broadly refers to a medium used to convey information in a signal form from a transmitter to a receiver, and the quality of a channel is governed by nature and is associated with an upper bound on what is achievable. Within a channel, a link may be further established after some parameters of a communication system are decided. In addition, the communication connection may be direct or indirect. An indirect communication connection broadly refers to a link and/or a channel which does not directly couple a source node to a final destination node configured to receive data from the source node. On the other hand, a direct communication connection broadly refers to a link and/or a channel which directly couples a source node to a final destination node configured to receive data from the source node.

An example communication system may include more than one link and/or channel, such as a multi-channel wireless communication system. The performance of a communication link may be characterized by a spectrum of operational characteristics, such as, without limitation, reception rate, distribution of reception rates over different time periods, stability of the reception rates for individual links, correlations of reception rates of links between different pairs of transmitters and receivers, dependency of reception rates on single and combined input parameters, signal/noise ratio, and noise properties, such as noise level, noise probability distribution, noise temporal properties that modify the transmission of intended communication signal. Some example input parameters considered in a communication system may include, without limitation, antenna power, antenna orientation, antenna height, packet length, type of modulation, type and parameters of error correction code, and synchronization code. The input parameters may affect performances in a communication system. For example, a higher antenna power may enhance a signal's strength so that the signal/noise ratio can be decreased. To design a communication system, modeling may be used to describe or predict relationships between input parameters and operational characteristics. Specifically, in a complex communication system with multiple links and/or channels, each having its own unique behavior, statistical techniques can be used in establishing a model based on limited collected data. In addition, the model may also be executed to predict behaviors of a link and/or channel and identify problems in the communication system based on any technical feasible techniques. The problems may arise from communication protocols, malfunctions of hardware, or interferences originated outside of the communication system. The output generated by executing the model can then be used to reconfigure the communication system.

FIG. 1 is a flowchart of a method or process 100 for developing a model to characterize a communication connection in a communication system, according to at least some embodiments of the present disclosure. Method 100 may include one or more operations and/or functions that are represented as blocks 101-113. The communication connection may refer to a link and/or channel.

In brief, processing for method 100 may be initiated at block 101, where a time period may be specified to reduce the amount of data to be processed, especially in a complex communication system. Block 101 may be followed by block 103, where a link and/or channel may be activated according to one or more input parameters. Processing may continue from block 103 to block 105, where the values of the input parameters and the values of the identified operational characteristics of interest may be collected. Block 105 may be followed by block 107, where statistical techniques may be applied to the collected values in block 105 to establish a model for the communication system. Continuing from block 107 to block 109, the model developed in block 107 may be validated to determine whether the model is appropriate to characterize the link and/or channel to be modeled. Processing may continue from block 109 to block 111 when the model passes validation. Otherwise, processing may continue from block 109 to block 107 when the model fails to pass validation. The validated model may then be executed to generate output. In block 111, the communication system may be reconfigured based on the output of the validated model. Further details of process 100 will be described below.

Because the performance of a link and/or channel may be affected by multiple input parameters, and to further reduce the amount of data to be processed, certain input parameters and operational characteristics of interest associated with the communication system may be identified in block 101. The identified input parameters may include, without limitation, antenna power, antenna orientation, antenna height, packet length, type of modulation, type and parameters of error correction code, and synchronization code. The operational characteristics of interest may include, without limitation, reception rate, distribution of reception rates over different time periods, stability of the reception rates for individual links, correlations of reception rates of links between different pairs of transmitters and receivers, dependency of reception rates on single and combined input parameters, signal/noise ratio, and noise properties, such as noise level, noise probability distribution, noise temporal properties that modify the transmission of intended communication signal.

In some examples, the link and/or channel may be activated in block 103 after the time period is specified and the input parameters and the operational characteristics of interest are identified according to the various input parameters, and data begins to flow in the link and/or channel.

As described previously above, through monitoring the activated link and/or channel, the values of the input parameters and the values of the identified operational characteristics of interest may be collected at block 105. In some implementations, more than one link and/or channel in a communication system may be activated, and the data of interest may be collected for each of the activated links and/or channels.

Because the data collected in block 105 is limited to data collected in one or more links and/or channels of the communication system within a specified time period, block 107 may be arranged to apply statistical techniques to establish a model for the communication system. The model may then be capable of predicting the operational characteristics of interest of a link and/or channel given a set of input parameters. In addition, if the model is given the information regarding how the input parameters for a link and/or channel may change as time passes, then the model may also be configured to predict the operational characteristics of interest associated with the link and/or channel at different time periods.

The statistical technique may include, without limitation, processes and methods for kernel estimation, boosting, shape regressions, smoothness, monotonic regressions, and convexity. Suppose the technique is monotonic regression, which is used to imply a trend that is either strictly increasing or strictly decreasing. In some implementations, an example monotonic regression model may describe a linear relationship among one or more input parameters and an operational characteristic of interest. With the linear relationship, the value of the operational characteristic of interest can be predicted after the values of the input parameters are measured. The resulting model may be parametric or non-parametric. In a parametric model, the data sets and the interactions among the data sets may remain consistent as the model is developed. It is important to note that the appropriate statistical techniques should not be limited to the statistical techniques listed above. Any technically feasible statistical techniques may be adapted for a variety of communication systems associated with various input parameters and operational characteristics of interest.

In some examples, an operational characteristic of interest is associated more than one input parameters and thus makes the collected data set multi-dimensional for statistical analysis. Some techniques may be adopted to reduce the multi-dimensional data set to a lower dimensional data set, such as principal component analysis and independent component analysis. For example, suppose two input parameters and one operational characteristic of interest are identified in block 101, and the values of the two input parameters may affect the value of the single operational characteristic of interest. Based on data collected in block 105, dimensional reduction techniques may be used to determine the appropriate combination of a first value for the first input parameter and a second value for the second input parameter that yields a desirable value for the specific operational characteristic of interest. In some implementations, a statistical technique may be applied to the appropriate combination of a first value for the first input parameter and a second value for the second input parameter and an operational characteristic of interest associated with the first input parameter and the second input parameter.

As briefly described above the model developed in block 107 may be validated to determine whether the model is appropriate to characterize the link and/or channel to be modeled at block 109. Some example techniques for validating a model include, but are not limited to, test-and-sample techniques, re-substitution techniques, and constraint manipulation techniques, such as data reweighing. For example, the values of the input parameters used in the model may be applied to a communication system. The actual values of the operational characteristics of interest measured in the communication system may then be compared with the values predicted by the model. When the difference between the actual values and the predicted values are within a predetermined range of values, then the model may be considered to have been validated. The predetermined range of values may vary depending on how long a link and/or channel is used. When the link and/or channel is used very briefly, the predetermined range of values may have a maximum around twenty five percents or more. When the link and/or channel is used for a long period (e.g., for sending a movie through the link and/or channel), the predetermined range of values may have a maximum around one percent to two percents.

If the statistical model is validated, then at block 111, the communication system may be reconfigured. By executing the validated model and also changing one or more input parameters, the validated model may generate certain output. The reconfiguration may be based on the output of the validated model. Some examples of reconfiguration may include, but are not limited to, adjusting antenna power, adjusting antenna orientation, changing the height of one or more antennas, configuring transmitters and receivers to accept packets having a certain amount of length and so on.

Figure 2:
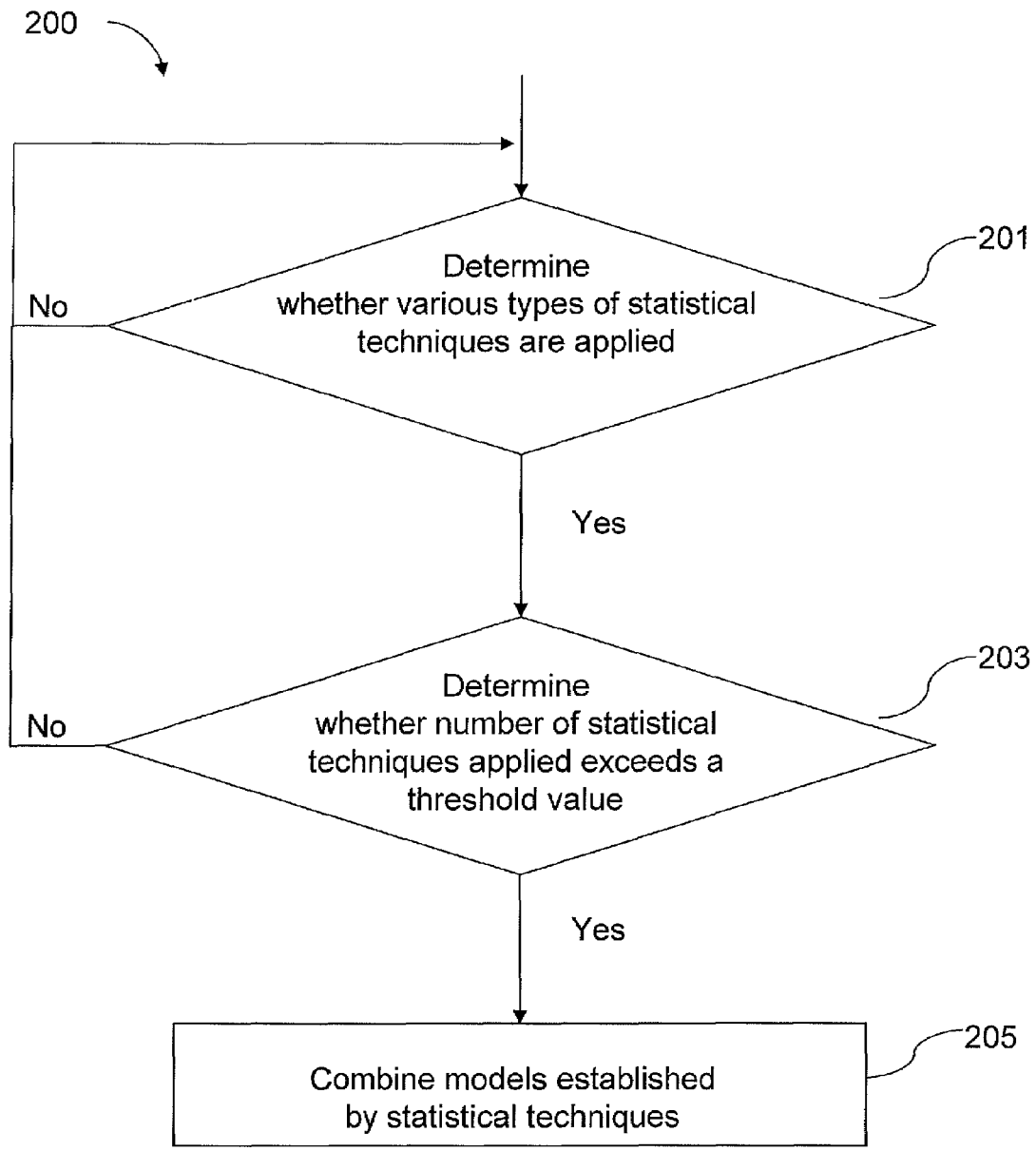
FIG. 2 is a flowchart of a method or process for combining models established by one or more statistical techniques, wherein the models are configured to characterize a communication connection in a communication system.

FIG. 2 is a flowchart of a method or process 200 for combining models established by one or more multiple statistical techniques, wherein the models are configured to characterize a communication channel in a communication system, according to at least some embodiments of the present disclosure. In some implementations, a first one and a second one of the models may be established by applying a first and a second statistical technique to a set of data collected in one or more links and/or channels in a communication system, respectively, Method 200 may include one or more operations and/or functions that are represented as blocks 201-205. At block 201, a statistical technique to be applied to the set of data may be examined qualitatively. Qualitative examination at block 201 may generally refer to a determination of whether multiple types of statistical techniques have been applied to the set of data. For example, qualitative examination may determine whether statistical techniques emphasizing in smoothness, monotonicity, and convexity are used. If the number of types of statistical techniques used in block 201 is less than a first threshold value, then a new type of statistical technique may be applied, and block 201 may be repeated. If the number of types of statistical techniques used in block 201 is equal to or greater than a first threshold value, then the method 200 may proceed to block 203. At block 203, the applied statistical techniques may be examined quantitatively. Quantitative examination at block 203 may generally refer to a determination of whether the number of the applied statistical techniques exceeds a second threshold value. If the quantitative examination fails, then additional statistical techniques may be requested, and the method 200 may proceed back to block 201. If the quantitative examination at block 203 passes, then the method 200 may proceed to block 205. At block 205, the models established by the statistical techniques may be combined using some techniques which may include, without limitation, maximum likelihood estimation and inferential statistics.

Figure 3:
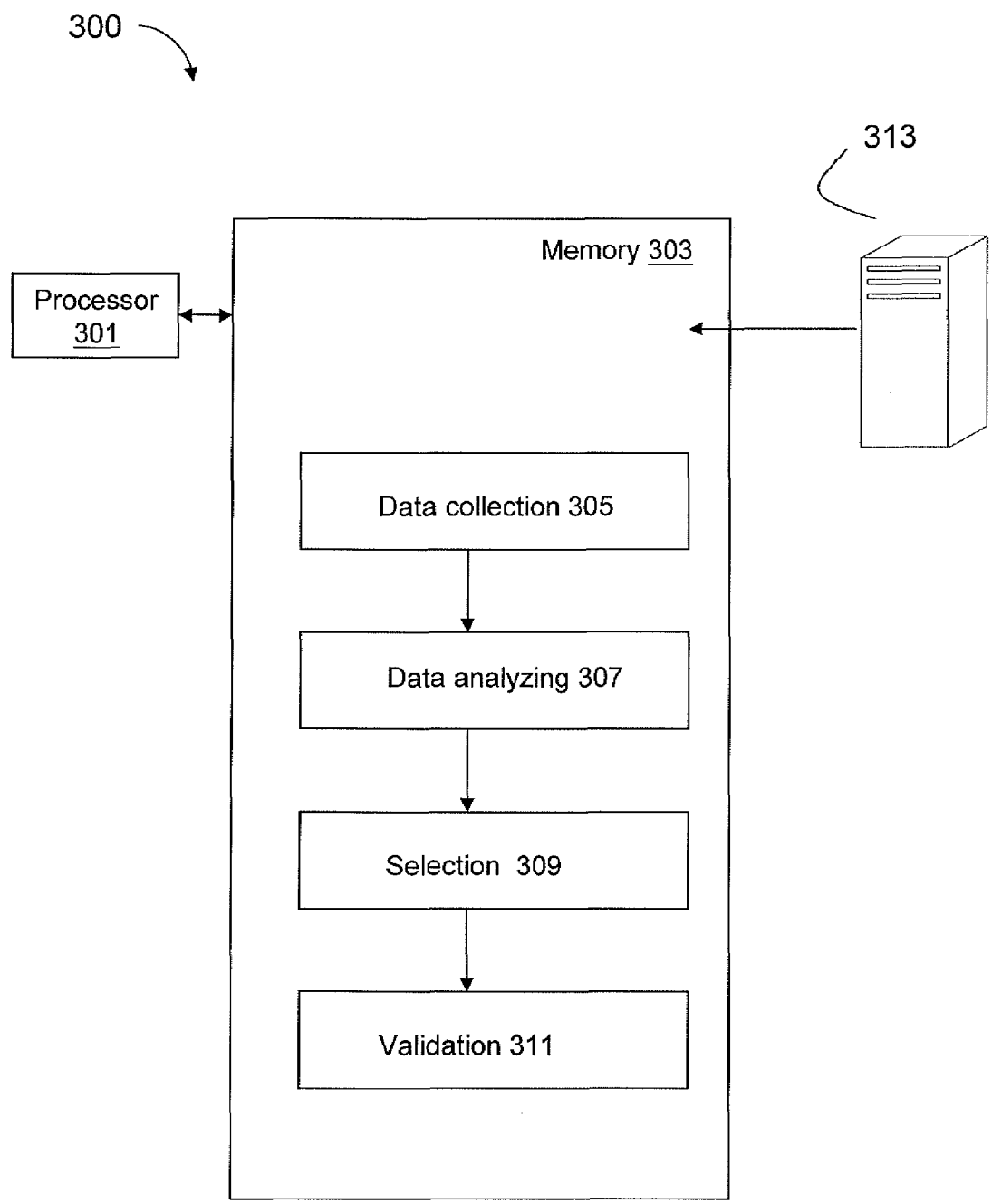
FIG. 3 is a block diagram illustrating the software modules of a computer program configured to analyze performances of communication connections in a MIMO system.

FIG. 3 is a block diagram illustrating the software modules of a computer program configured to analyze performances of communication connections a MIMO system, according to at least some embodiments of the present disclosure. The computer program may include one or more operational modules or function blocks or logical portions such as illustrated by modules 305-311. Module 305 may correspond to a data collection module. Module 307 may correspond to a data analyzing module. Module 309 may correspond to a selection module for selecting appropriate statistical models stored in a storage facility 313. Module 311 may corresponds to a validation module for validating the selected statistical models. In some implementations, the instructions for each of the modules described above and the selected statistical models may be loaded into memory 303 and may be executed by one or more processors 301.

The data collection module 305 may be configured to collect the operational characteristics of interest and the corresponding input parameters of a link and/or channel of a MIMO system when the link and/or channel is activated. The input parameters and the operational characteristics of interest of links and/or channels can be collected through a connection between a computing device executing the software modules and the MIMO system. The connection may be a wired connection or a wireless connection. In some implementations, the collected input parameters and the operational characteristics of interest may be stored in the storage facility 313 for further processing.

The data analyzing module 307 may be configured to retrieve the input parameters and the operational characteristics of interest stored in the storage facility 313. The retrieved input parameters and the operational characteristics of interest may then be analyzed based on a limited set of data collected by the data collection module 305 to identify the relationships among the input parameters and the operational characteristics of interest. The selecting module 309 in some implementations may select appropriate statistical techniques from the storage facility 313 and apply the statistical techniques to the identified relationships to establish a model for the MIMO system. The validation module 311 may be configured to validate the statistical techniques selected by the selection module 309.

Although FIG. 3 illustrates various functions, operations or modules that are partitioned into blocks 305, 307, 309 and 311, the disclosure is not so limited. In some examples the various blocks of FIG. 3 may be divided into additional blocks and/or combined into one or more other blocks without departing from the spirit of the present disclosure.

Figure 4:
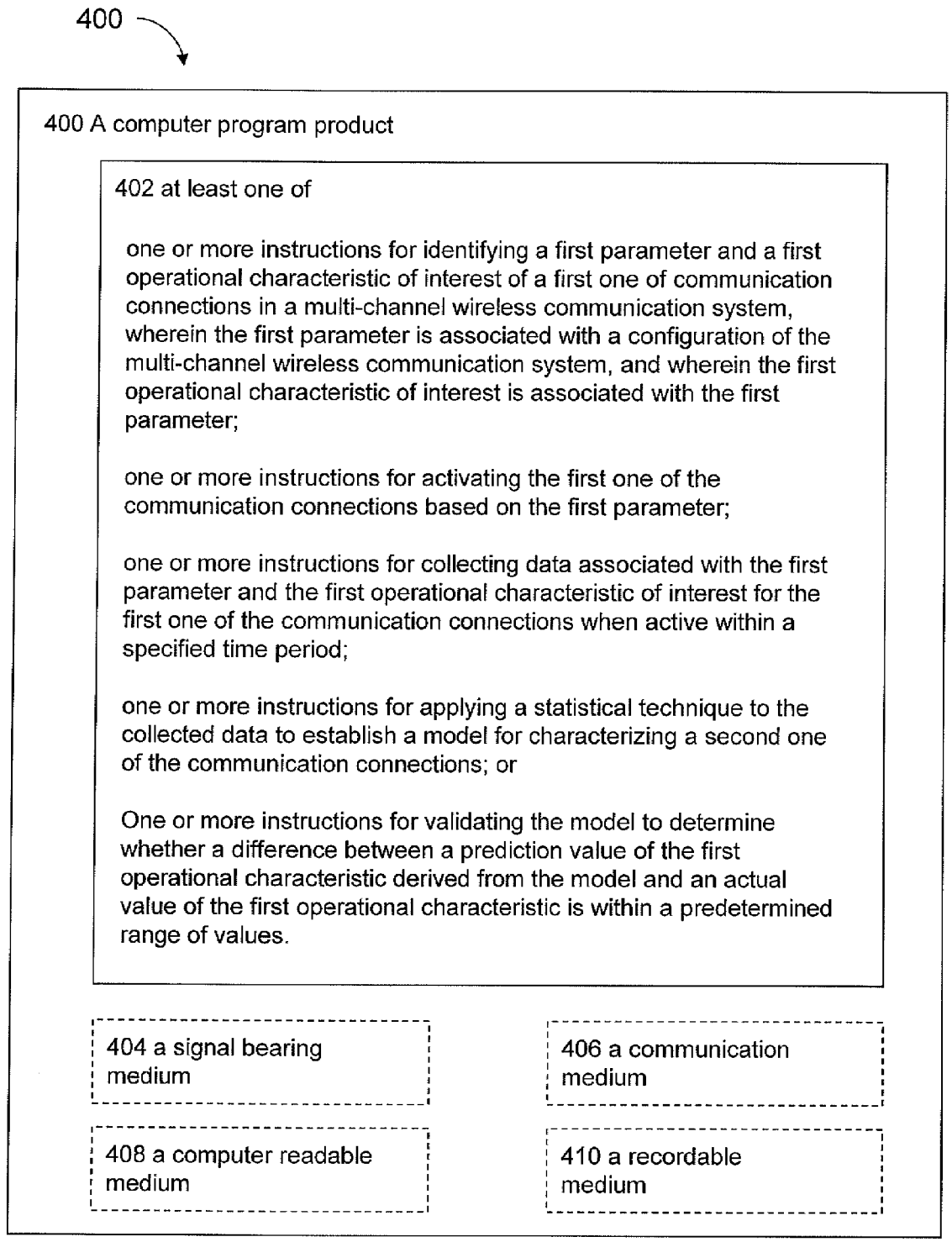
FIG. 4 is a block diagram illustrating a computer program product for analyzing performances of communication connections in a MIMO system.

FIG. 4 is a block diagram illustrating a computer program product 400 for developing a model to characterize a communication connection in a communication system with multiple links and/or channels in accordance with at least some embodiments of the present disclosure. Computer program product 400 may include one or more sets of executable instructions 402 for executing the methods for analyzing performances of links and/or channels in a communication system. For illustration only, the instructions 402 reflect the methods described above and illustrated in FIG. 1. The instructions 402 may also include, without limitation, the methods illustrated in FIG. 2. Computer program product 400 may be transmitted in a signal bearing medium 404 or another similar communication medium 406. Computer program product 400 may be recorded in a computer readable medium 408 or another similar recordable medium 410.

Figure 5:
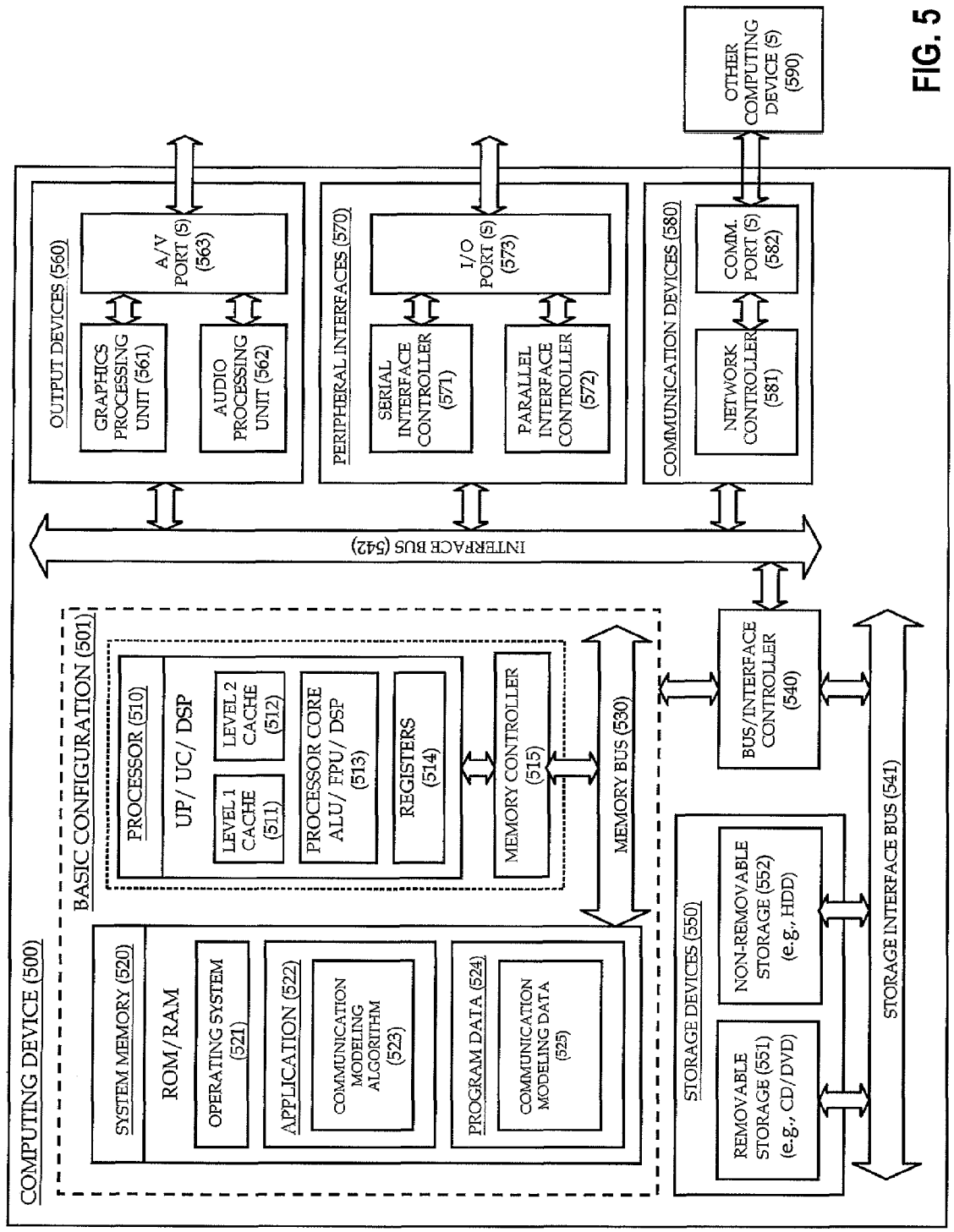
FIG. 5 is an exemplary computing system configured to develop a model to characterize a communication connection in a communication system, all arranged in accordance with at least some embodiments of the present disclosure.

FIG. 5 is a block diagram illustrating an example computing device 500 that is arranged for developing a model to characterize a communication connection in a communication system in accordance with the present disclosure. In a very basic configuration 501, computing device 500 typically includes one or more processors 510 and system memory 520. A memory bus 530 may be used for communicating between the processor 510 and the system memory 520.

Depending on the desired configuration, processor 510 may be of any type including but not limited to a microprocessor (µP), a microcontroller (µC), a digital signal processor (DSP), or any combination thereof. Processor 510 may include one more levels of caching, such as a level one cache 511 and a level two cache 512, a processor core 513, and registers 514. An example processor core 513 may include an arithmetic logic unit (ALU), a floating point unit (FPU), a digital signal processing core (DSP Core), or any combination thereof. An example memory controller 515 may also be used with the processor 510, or in some implementations the memory controller 515 may be an internal part of the processor 510.

Depending on the desired configuration, the system memory 520 may be of any type including but not limited to volatile memory (such as RAM), non-volatile memory (such as ROM, flash memory, etc.) or any combination thereof. System memory 520 may include an operating system 521, one or more applications 522, and program data 524. Application 522 may include a communication modeling algorithm 523, which may be arranged to analyze data to determine a relationship among one or more input parameters and one or more operational characteristics of interest. Program Data 524 may include communication modeling data 525, which may be associated with the one or more input parameters and the one or more operational characteristics of interest, as will be further described below. In some embodiments, application 522 may be arranged to operate with program data 524 on an operating system 521 such that the relationship among the one or more input parameter and the one or more operational characteristics of interest may be determined. This described basic configuration is illustrated in FIG. 5 by those components within dashed line 501.

Computing device 500 may have additional features or functionality, and additional interfaces to facilitate communications between the basic configuration 501 and any required devices and interfaces. For example, a bus/interface controller 540 may be used to facilitate communications between the basic configuration 501 and one or more data storage devices 550 via a storage interface bus 541. The data storage devices 550 may be removable storage devices 551, non-removable storage devices 552, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 520, removable storage 551 and non-removable storage 552 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 500. Any such computer storage media may be part of device 500.

Computing device 500 may also include an interface bus 542 for facilitating communication from various interface devices (e.g., output interfaces, peripheral interfaces, and communication interfaces) to the basic configuration 501 via the bus/interface controller 540. Example output devices 560 include a graphics processing unit 561 and an audio processing unit 562, which may be configured to communicate to various external devices such as a display or speakers via one or more A/V ports 563. Example peripheral interfaces 570 include a serial interface controller 571 or a parallel interface controller 572, which may be configured to communicate with external devices such as input devices (e.g., keyboard, mouse, pen, voice input device, touch input device, etc.) or other peripheral devices (e.g., printer, scanner, etc.) via one or more I/O ports 573. An example communication device 580 includes a network controller 581, which may be arranged to facilitate communications with one or more other computing devices 590 over a network communication link and/or channel via one or more communication ports 582.

The network communication link and/or channel may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 500 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 500 may also be implemented as a personal computer including both laptop computer and non-laptop computer configurations.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link and/or channel, a wireless communication link and/or channel, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

I claim:

1. A method for modeling communication connections in a multi-channel wireless communication system, comprising:
for a first one of the communication connections in the multi-channel wireless communication system, identifying a first parameter and a first operational characteristic of interest, wherein the first parameter is configured to affect performance of the multi-channel wireless communication system, and wherein the first operational characteristic of interest is associated with the first parameter and characterizes the performance of the multi-channel wireless communication system;
activating the first one of the communication connections for data to begin flowing in the first one of the communication connections;
collecting values associated with the first parameter and the first operational characteristic of interest for the first one of the communication connections when the data flow in the first one of the communication connections within a specified time period;
applying a statistical technique to the collected values to establish a model for characterizing a second one of the communication connections;
applying a first value of the first parameter to the second one of the communication connections so that an actual value of the first operational characteristic of interest is measured;
applying the first value of the first parameter to the model so that a prediction value of the first operational characteristic of interest is obtained; and
validating the model to determine whether a difference between the prediction value of the first operational characteristic of interest and the actual value of the first operational characteristic of interest is within a predetermined range of values.

2. The method of claim 1, wherein the first one of the communication connections and the second one of the communication connections are the same.

3. The method of claim 1, further comprising:
executing the model to generate an output; and
reconfiguring the multi-channel wireless communication system based on the output of the model.

4. The method of claim 2, wherein collecting is repeated in different time periods.

5. The method of claim 1, wherein the statistical technique includes a monotonic regression analysis.

6. The method of claim 1, wherein the statistical technique is data-driven.

7. The method of claim 1, further comprising:
for the first one of the communication connections in the multi-channel wireless communication system, identifying a second parameter and a second operational characteristic of interest, wherein the second parameter is configured to affect performance of the multi-channel wireless communication system, and the first operational characteristic of interest and the second operational characteristic of interest are associated with one or both of the first parameter and the second parameter and characterize the performance of the multi-channel wireless communication system;
collecting values associated with the second parameter and the second operational characteristic of interest for the first one of the communication connections within the specified time period; and
applying a dimensional reduction technique to determine a combination of a first value for the first parameter and a second value for the second input parameter that yields a first desirable value for the first operational characteristic of interest and a second desirable value for the second operational characteristic of interest.

8. The method of claim 1, wherein validating further comprises using one or more of a test-and-sample technique, a re-substitution technique, or a constraint manipulation technique.

9. The method of claim 1, wherein the communication connections each corresponds to a communication link, a communication channel, or a combination of the communication link and the communication channel.

10. A computing device for characterizing communication connections in a multi-channel wireless communication system, comprising:
a memory; and
a processing unit arranged to interface with the memory, wherein the processing unit is configured to:
collect a limited set of data associated with a selected one of the communication connections measured in the multi-channel wireless communication system when data flow in the selected one of the communication connections, wherein the limited set of data includes a first set of collected data that affects performance of the multi-channel wireless communication system and a second set of collected data that characterizes the performance of the multi-channel wireless communication system;
store the limited set of data in the memory;
apply a dimensional reduction technique to the stored limited set of data to determine a combination of a first value for the first set of collected data and a second value for the second set of collected data that yields a first desirable value for a third set of collected data;
apply a first statistical technique to the combination and the third set of collected data to establish a first model; and
examine the first statistical technique to determine whether one or more types of statistical techniques have been applied.

11. The computing device of claim 10, wherein the first set of data and the second set of data includes one or more of antenna power, antenna orientation, antenna height, packet length, type of modulation, type and parameters of error correction code, or synchronization code.

12. The computing device of claim 10, wherein the third set of data includes one or more of noise properties, reception rate, distribution of reception rates over different time periods, stability of the reception rates for individual connections, correlations of reception rates of connections between different pairs of transmitters and receivers, or dependency of reception rates on single and combined input parameters.

13. The computing device of claim 10, wherein the processing unit is further configured to apply a second statistical technique to the combination and the third set of collected data to establish a second model.

14. The computing device of claim 13, wherein the processing unit is further configured to examine the first statistical technique and the second statistical technique to determine whether a number of statistical techniques applied exceeds a threshold value.

15. The computing device of claim 13, wherein the processing unit is further configured to combine the first model and the second model.

16. The computing device of claim 10, wherein the communication connections each corresponds to a communication link, a communication channel, or a combination of the communication link and the communication channel.

17. A non-transitory computer-readable medium containing a sequence of instructions associated with a multi-channel wireless communication system with communication connections, which when executed by a computing device, causes the computing device to:
 identify a type of data to be collected in a first one of the communication connections in the multi-channel wireless communication system;
 collect a first set of data and a second set of data in the first one of the communication connections measured in the multi-channel wireless communication system within a first time period when data flow in the first one of the communication connections, wherein the first set of data has a first dimension and affects performance of the multi-channel wireless communication system, and the second set of data characterizes the performance of the multi-channel wireless communication system;
 transform the collected first set of data to a third set of data, wherein the third set of data has a second dimension and the second dimension is less than the first dimension;
 apply a statistical technique to the second set of data and the third set of data to establish a model to characterize a second one of the communication connections of the multi-channel wireless communication system; and
 validate the model to determine whether the model is appropriate to characterize the second one of the communication connections.

18. The non-transitory computer-readable medium of claim 17, further including a sequence of instructions, which when executed by the computing device, causes the computing device to collect a fourth set of data in the first one of the communication connections in the multi-channel wireless communication system within a second time period.

19. The non-transitory computer-readable medium of claim 17, further including a sequence of instructions, which when executed by the computing device, causes the computing device to collect a fourth set of data in the second one of the communication connections in the multi-channel wireless communication system within the first time period.

20. The non-transitory computer-readable medium of claim 17, further including a sequence of instructions, which when executed by the computing device, causes the computing device to:
 execute the model to generate an output; and
 reconfigure the multi-channel wireless communication system based on the output of the model.

21. The non-transitory computer-readable medium of claim 17, further including a sequence of instructions, which when executed by the computing device, causes the computing device to identify a problem associated with the first one of the communication connections or the second one of the communication connections in the multi-channel wireless communication system.

22. The non-transitory computer-readable medium of claim 17, further including a sequence of instructions, which when executed by the computing device, causes the computing device to examine the statistical technique to determine whether one or more types of statistical techniques have been applied.

23. The non-transitory computer-readable medium of claim 17, wherein the communication connections each corresponds to a communication link, a communication channel, or a combination of the communication link and the communication channel.

* * * * *